(12) United States Patent
Hawa (10) Patent No.: US 10,145,478 B2
(45) Date of Patent: Dec. 4, 2018

(54) TOP ENTRY SOFT SEATS FLOATING BALL VALVE

(71) Applicant: Hawa Valves (India) Private Limited, Navi, Mumbai (IN)

(72) Inventor: Javed Anwar Hawa, Mumbai (IN)

(73) Assignee: Hawa Valves (India) Private Limited, Navi, Mumbai (IN)

( * ) Notice: Subject to any disclaimer, the term of this patent is extended or adjusted under 35 U.S.C. 154(b) by 0 days.

(21) Appl. No.: 15/605,576

(22) Filed: May 25, 2017

(65) Prior Publication Data
US 2018/0023711 A1    Jan. 25, 2018

(30) Foreign Application Priority Data
Jul. 22, 2016    (GB) .................................. 1612735.9

(51) Int. Cl.
*F16K 5/06*    (2006.01)

(52) U.S. Cl.
CPC .......... *F16K 5/0636* (2013.01); *F16K 5/0663* (2013.01); *F16K 5/0678* (2013.01); *Y10T 137/0508* (2015.04); *Y10T 137/6045* (2015.04)

(58) Field of Classification Search
CPC .... F16K 5/0636; F16K 5/0663; F16K 5/0673; F16K 5/0678; F16K 5/0684; F16K 5/0689; Y10T 137/0508; Y10T 137/6045
USPC ........ 251/315.01–315.16; 137/15.22, 315.21
See application file for complete search history.

(56) References Cited

U.S. PATENT DOCUMENTS

| | | | | |
|---|---|---|---|---|
| 3,038,489 A | * | 6/1962 | Allen | ........................ F16K 5/06 251/315.12 |
| 3,161,204 A | * | 12/1964 | Roy, Sr. | ................ F16K 5/0636 137/315.21 |
| 3,211,421 A | * | 10/1965 | Johnson, Jr. | .......... F16K 5/0678 251/315.05 |
| 3,214,135 A | * | 10/1965 | Hartmann | ............. F16K 5/0689 137/246.22 |

(Continued)

FOREIGN PATENT DOCUMENTS

| | | |
|---|---|---|
| GB | 978481 A | 12/1964 |
| GB | 1245109 A | 9/1971 |
| GB | 2210141 A | 6/1989 |

OTHER PUBLICATIONS

United Kingdom Intellectual Property Office, Search Report in United Kingdom Patent Application No. GB1612735.9, dated Nov. 8, 2016, 1 p.

*Primary Examiner* — John Bastianelli
(74) *Attorney, Agent, or Firm* — Leydig, Voit & Mayer, Ltd.

(57) ABSTRACT

A top entry ball valve comprises a housing with a central cavity communicating with two bores which define a flow path through the housing. A ball valve element is provided and comprises a through bore. The ball valve element is rotatably mounted within the central cavity for rotation about an axis for selectively aligning the through bore with the housing bores. The ball valve element further comprises first and second flat surfaces on opposite sides of the ball valve element. The flat surfaces are perpendicular to the axis. The top entry ball valve further comprises first and second seats which are configured to provide a seal between the ball valve element and the central cavity. First and second protective rings are provided for receiving and supporting at least a portion of the first and second seats.

5 Claims, 8 Drawing Sheets

(56) References Cited

U.S. PATENT DOCUMENTS

| | | | | |
|---|---|---|---|---|
| 3,219,055 A | * | 11/1965 | Dumm | F16K 5/0636 |
| | | | | 137/315.2 |
| 3,414,233 A | * | 12/1968 | Priese | F16K 5/0678 |
| | | | | 251/172 |
| 3,488,033 A | * | 1/1970 | Priese | F16K 5/202 |
| | | | | 251/172 |
| 3,508,736 A | * | 4/1970 | Pool | F16K 5/0673 |
| | | | | 251/172 |
| 3,920,036 A | * | 11/1975 | Westenrieder | F16K 5/0636 |
| | | | | 137/315.21 |
| 4,304,252 A | | 12/1981 | Stanton | |
| 4,637,421 A | * | 1/1987 | Stunkard | F16K 5/0636 |
| | | | | 251/315.12 |
| 5,551,479 A | * | 9/1996 | Graves | F16K 5/0636 |
| | | | | 137/315.21 |

\* cited by examiner

TOP ENTRY SOFT SEATS FLOATING BALL VALVE

CROSS-REFERENCE TO RELATED APPLICATIONS

The present invention claims priority to UK Patent Application No. 1612735.9 filed Jul. 22, 2016, which is incorporated herein by reference for all purposes.

TECHNICAL FIELD

The present invention relates to a top entry floating ball valve for controlling the flow of a fluid through a pipe, and a method of assembling such a valve.

BACKGROUND

Ball valves typically comprise of a generally spherical valve element, with a bore extending therethrough. The valve element is rotatably mounted in a housing which has aligned openings on either side, one for entry of fluid into the housing and one for exit of fluid from the housing. The valve element may be rotated such that the bore may either be aligned in the same direction as the openings or perpendicular to the openings. In the perpendicular orientation flow through the valve is prevented, while in the parallel direction flow of fluid through the valve is allowed. Each of the openings of the housing is provided with a sealing seat assembly for sealing between the opening and the ball valve element.

The seat assemblies are classified as either hard or soft, based upon whether they are integral with the valve body (hard) or made of a different, softer material (soft). Traditional top entry ball valves employ various complicated ball and seat assembly designs. Examples of typical assemblies include wedge designs, caged ball designs, and trunnion designs.

A wedge design requires the valve seats to be inserted in the valve body at an angle to the axis of the aligned openings. The bore of the ball is machined with a taper in order to interact with the degree of inclination of the seats. A spring is provided on the valve stem to force the ball towards the valve seats. An adjustment device is provided in order to keep the assembly in place and to allow adjustment of the assembly. This design requires skilled technicians for assembly and disassembly due to its complex nature.

Caged ball designs involve the complete assembly of ball and both seats being put in to a cage. This cage is attached to the valve cover and inserted into the valve body. This design requires a complex valve body shape, which can only be manufactured by casting the valve. If a forged valve body is used, special complicated machinery is required to manufacture suitable shapes. This therefore means that the cost of manufacturing such valve is prohibitively large.

Trunnion seat assemblies mechanically anchor the ball at its top and bottom. These assemblies require extra components to work, and add two leakage paths between the seat assembly and the valve body. Additionally, the designs are typically difficult to assemble, disassemble and service.

These traditional designs and assembly methods suffer from a number of common problems. These include inadvertently generating multiple leakage paths due to the relatively complex construction. In addition, special tools are often required which are solely supplied by the valve manufacturer. Such tools typically only work for a single size of valve and as such may vastly increase the maintenance and construction costs of such valves. These tools require trained and skilled operators.

SUMMARY

The present invention provides a top entry ball valve according to claim 1, and a method of assembling a top entry ball valve according to claim 8.

The ball valve element is provided with two flat surfaces on opposite sides of the element which mean that the ball valve may be more easily constructed as the ball valve element may be simply inserted perpendicular to its operating orientation and rotated into position.

Additionally, the valve seats are received in protective rings which receive and support them. These protective rings strengthen the soft valve seats against installation deformation, as well as acting as back-up fire seals in the event of a pipeline fire which may damage the soft seats.

BRIEF DESCRIPTION OF THE DRAWING(S)

The invention will now be described in detail, by way of example only, with reference to the accompanying drawings in which.

DETAILED DESCRIPTION

An embodiment of the present invention is shown as the top entry ball valve 100 in FIGS. 1 to 11. The housing 1 of the top entry ball valve 100 is provided with two axially aligned bores 10, 11 for attaching to a fluid pipe system. For the purposes of the following description, the left opening 10 is considered the inlet opening and the right opening 11 is considered the outlet opening. However, in use the valve may operate in a reverse orientation. The inlet and outlet openings 10, 11 define a longitudinal axis X. While the inlet and outlet openings 10, 11 are co-axial in the illustrated embodiment, this is not necessarily the case and offset openings may be provided. The housing 1 is also provided with a central cavity 4, which opens towards the top of the housing 1. The top opening is covered in use by a valve lid 2 which is attached to the housing 1.

A ball valve element 3 is mounted within the central cavity 4 in the housing 1. The ball valve element 3 is essentially spherical and comprises a through bore 5. The ball valve element 3 has a flat upper surface 9 on which is formed an engagement slot 8, perpendicular to the through bore 5. The ball valve element 3 may also have a flat lower surface 9A on which a second engagement slot 8A may also be formed. By providing engagement slots 8, 8A on each of the flat surfaces 9, 9A the ball valve element 3 may be installed either way up in the cavity 4. The engagement slots 8, 8A may extend from the flat surfaces 9, 9A to the through bore 5.

Figure 1:
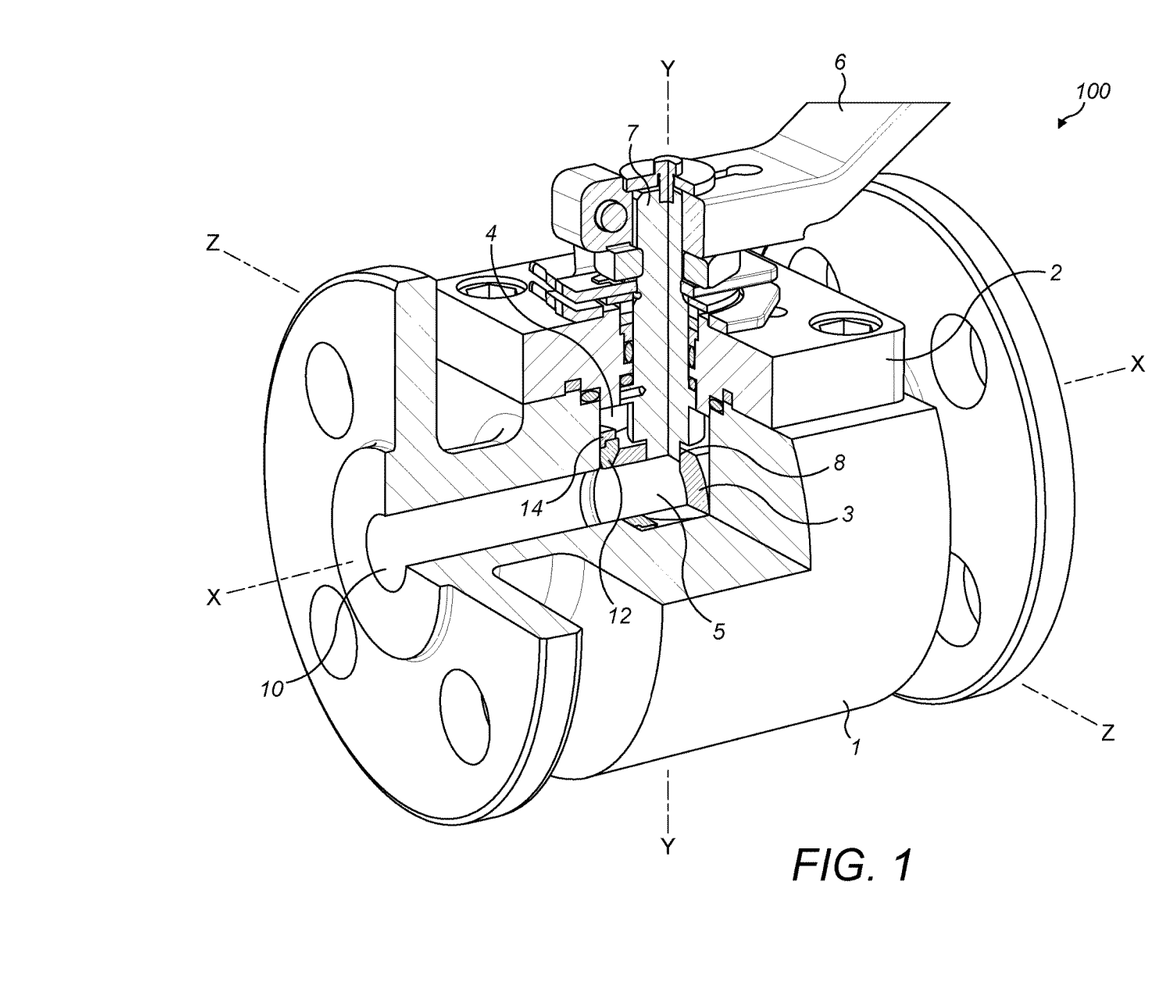
FIG. 1 is a partial perspective cutaway of a top entry ball valve according to one embodiment of the present invention.
Figure 2:
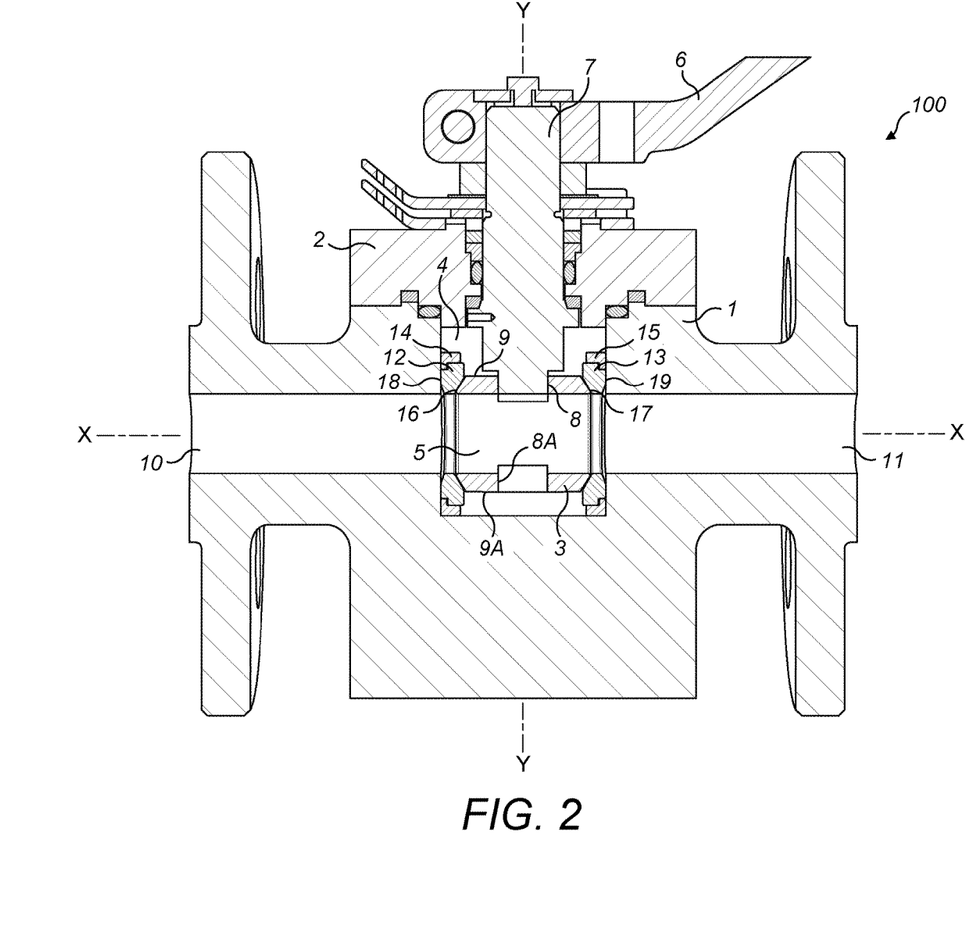
FIG. 2 is side section view of the top entry ball valve of FIG. 1.

The ball valve element 3 is able to rotate about an axis Y perpendicular to the axis X of the opening bores 10, 11 within the central cavity 4, between a position wherein the bore 5 is axially aligned with the openings 10, 11 as shown in FIGS. 1 and 2, and a position wherein the bore 5 is perpendicular with the openings 10, 11.

Rotation of the ball valve element 3 is driven by a valve stem 7 which is attached to the ball valve element 3 via the engagement slot 8. The valve stem 7 is provided with an engagement portion which is shaped to be received by the engagement slot 8. This valve stem 7 is driven by a valve handle 6 that may be actuated by a user. In the axially aligned position, fluid flows into the entry opening 10, through the bore 5 of the ball valve element 3 and out of the exit opening 11. In the perpendicular orientation fluid flowing into the entry opening 10 is not able to flow past the ball valve element 3. In this manner a user may rotate the valve handle 6 to control opening and closing of the top entry ball valve 100 in order to control a fluid flow.

Each bore 10, 11 is provided with a soft seat 12, 13 which is annular and is typically made from a thermoplastic material. The inner diameter of the soft seats 12, 13 is substantially equal to the inner diameter of the openings 10, 11. Each soft seat 12, 13 is provided with an inner sealing surface 16, 17 generally facing the centre of the top entry ball valve 100 and that is shaped to seal against an outer surface of the ball valve element 3. Each soft seat 12, 13 is also provided with an outer sealing surface 18, 19 generally facing away from the centre of the top entry ball valve 100 that is shaped to seal with the wall of the cavity 4. The left soft seat 12 seals with a portion of the wall of the cavity to form a continuous seal around the left opening 10, and the right soft seat 13 seals with a portion of the wall of the cavity 4 to form a continuous seal around the right opening 11. The soft seats 12, 13 engage with the wall of the cavity 4 and with an outer surface of the ball valve element 3 to form a liquid tight seal.

The soft seats 12, 13 are encased within protective rings 14, 15 which are separate from the housing 1. The protective rings 14, 15 may be made of any suitably strong protective material. In the present invention they are made of metal, which may be the same metal as the valve body 1. The protective rings 14, 15 are provided to act as a reinforcement to the soft seats 12, 13, to lend rigidity and strength to these seats 12, 13. Without the protective rings 14, 15 the soft seats 12, 13 may deform under the pressures of the fluid flowing through the valve assembly 100 which may cause the valve assembly 100 to leak. The protective rings 14, 15 are also able to act as a back-up fire-seal in case of a fire in the pipeline as the soft seats 12, 13 will be destroyed by significant heat since they are made of a thermoplastic.

The protective rings 14, 15 allow the method of manufacturing as described below to be achieved. Conventional top entry ball valves with soft seats comprise encasing metal sections machined into the body itself. However, these machined metal sections leave points of weakness where the bore for the openings 10, 11 merges with the central cavity 4. Under pressure, the soft seats 12, 13 would bulge and burst at these points. By providing separate soft seats 12, 13 which are reinforced, the pressure is not applied to these weak points.

The assembly of a top entry ball valve 100 according to the present invention will now be described with reference to FIGS. 3 to 11.

Figure 3:
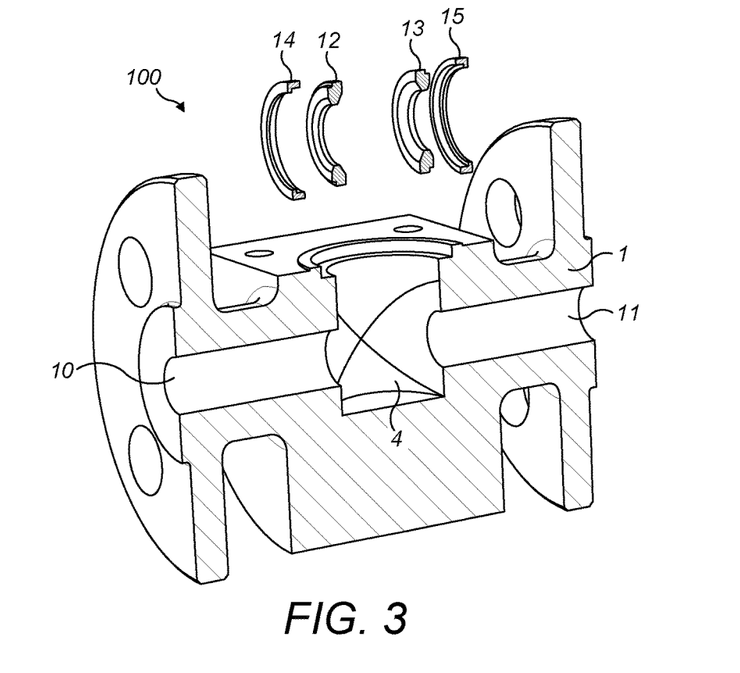
FIG. 3 is a perspective side section view of the top entry ball valve of FIG. 1, partway through the assembly of the top entry ball valve.
Figure 4:
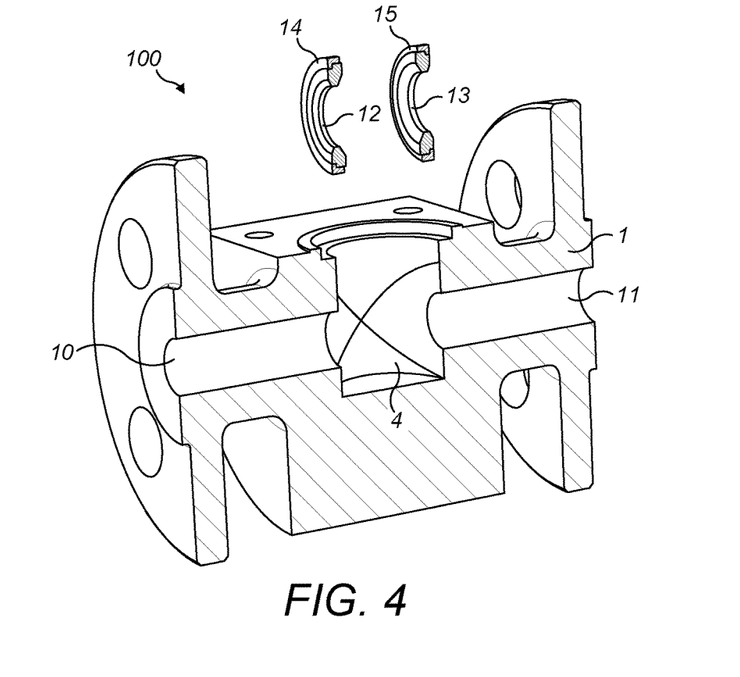
FIG. 4 is a perspective side section view of the top entry ball valve of FIG. 1, partway through the assembly of the top entry ball valve.
Figure 5:
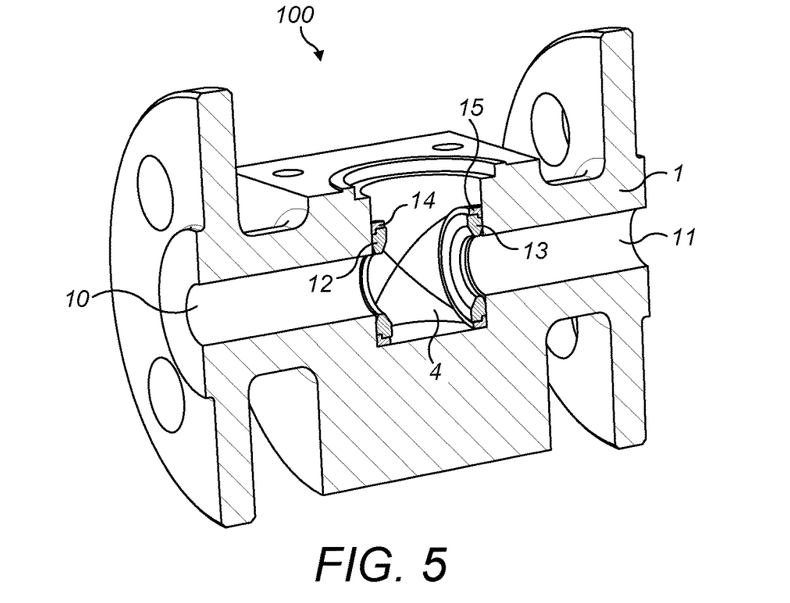
FIG. 5 is a perspective side section view of the top entry ball valve of FIG. 1, partway through the assembly of the top entry ball valve.

A valve body 1 as described above may be machined using simple turning operations and provided for assembly. A pair of soft seats 12, 13 are provided and inserted into metal protective rings 14, 15 as shown in FIGS. 3 and 4. The sub-assembly of the soft seats 12, 13 and the protective rings 14, 15 are placed into the central cavity 4 of the valve body 1 as shown in FIG. 5.

Figure 6:
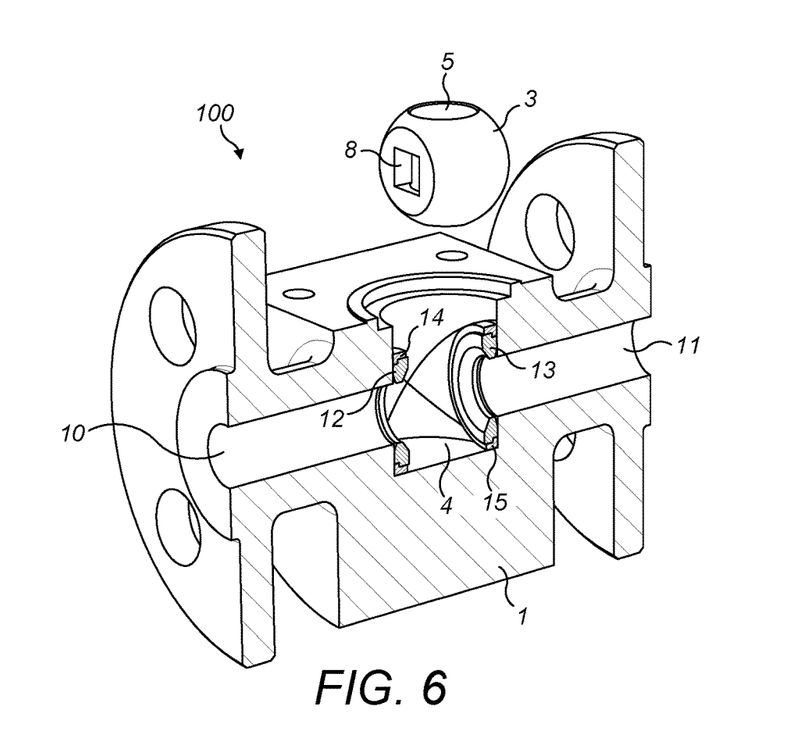
FIG. 6 is a perspective side section view of the top entry ball valve of FIG. 1, partway through the assembly of the top entry ball valve.
Figure 7:
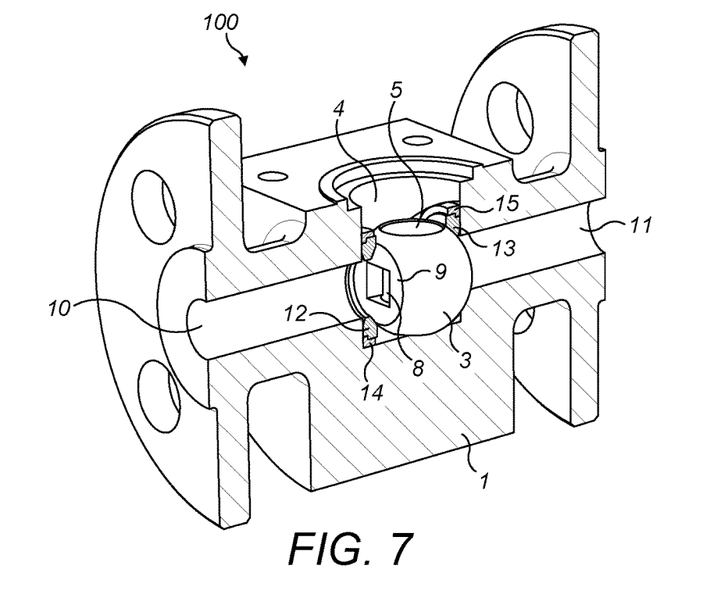
FIG. 7 is a perspective side section view of the top entry ball valve of FIG. 1, partway through the assembly of the top entry ball valve.
Figure 8:
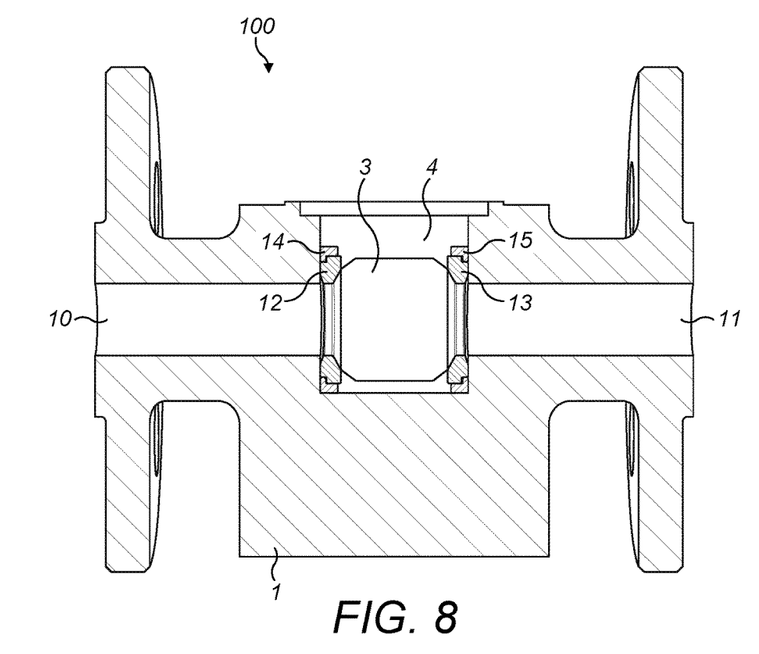
FIG. 8 is a side section view of the partially assembled top entry ball valve of FIG. 7.

A ball valve element 3 is then inserted into the valve assembly 100 along the axis Y. While in the illustrated embodiment the insertion axis is the same as the rotation axis Y for the ball valve element 3 in use, this is not necessarily the case. In particular, the insertion axis may be any axis apart from the axis X of the openings. The insertion axis should allow the ball valve element 3 to be inserted without having to disconnect any pipework attached to the openings 10, 11. As shown in FIG. 6, the ball valve is initially provided on its side (with respect to its final position) i.e. with the flat upper surface 9 containing the engagement slot 8 parallel with the axis X of the openings 10, 11 and the bore 5 perpendicular with this axis. The ball valve element 3 is then placed into the cavity 4 between the soft seats 12, 13 as shown in FIGS. 7 and 8.

Figure 9:
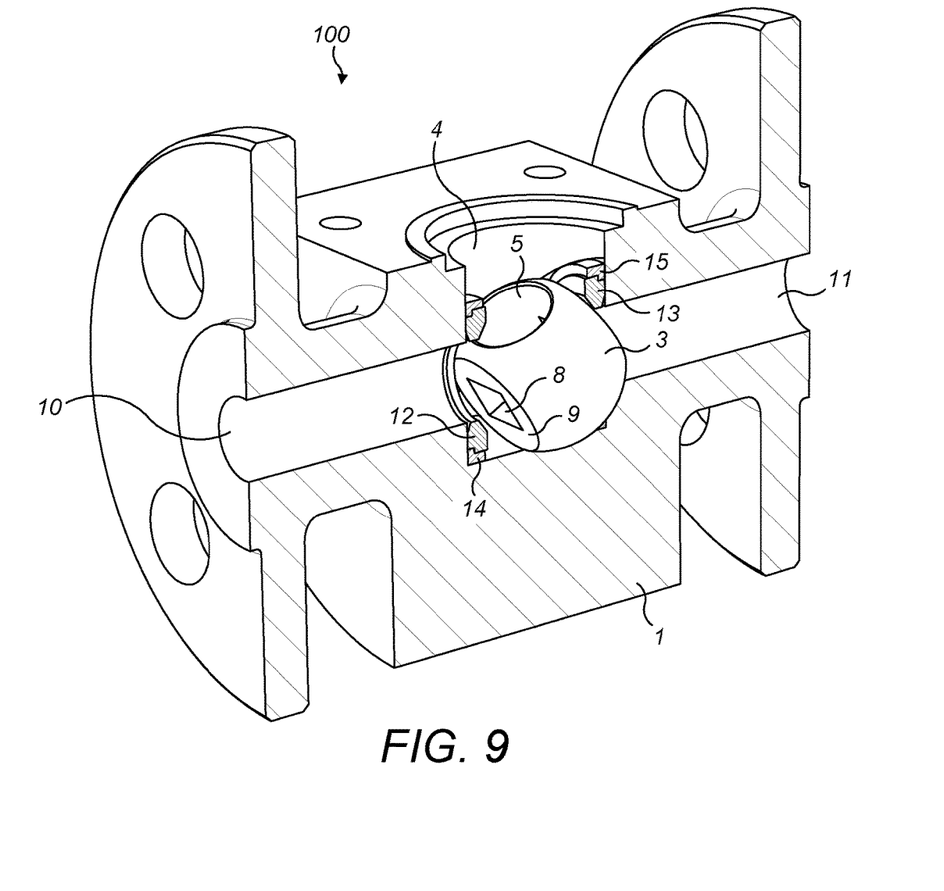
FIG. 9 is a perspective side section view of the top entry ball valve of FIG. 1, partway through the assembly of the top entry ball valve.
Figure 10:
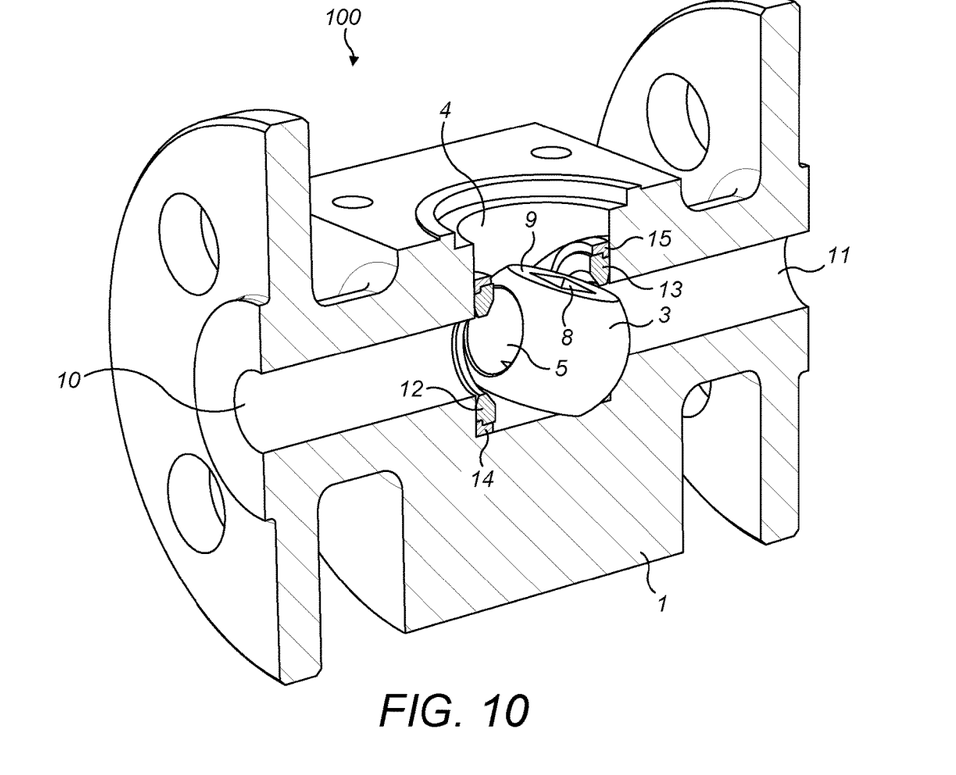
FIG. 10 is a perspective side section view of the top entry ball valve of FIG. 1, partway through the assembly of the top entry ball valve.

The ball valve element 3 is then rotated as shown in FIG. 9 about an axis Z, which is mutually perpendicular to both axis X and Y. The ball valve element 3 is rotated in a counter clockwise direction relative to FIG. 9. However, the ball valve element 3 may be rotated in the opposite direction. The rotation of the ball valve element 3 is continued as shown in FIG. 10.

Figure 11:
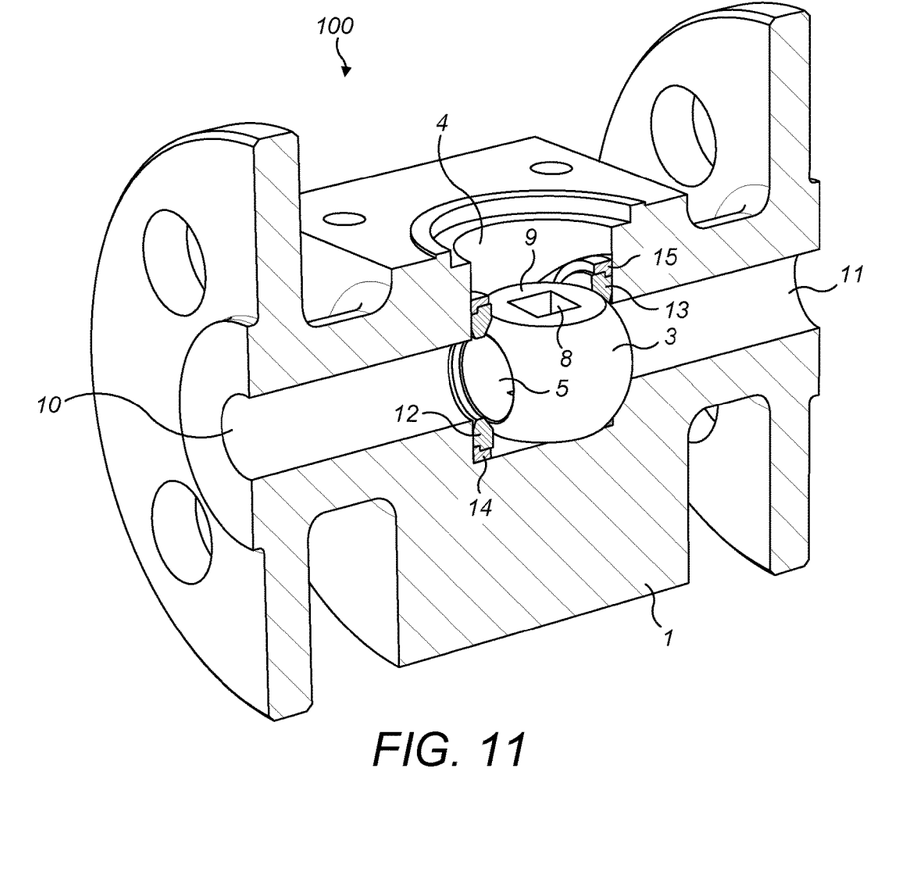
FIG. 11 is a perspective side section view of the top entry ball valve of FIG. 1, partway through the assembly of the top entry ball valve.

The rotation is continued until the ball valve element 3 has rotated through 90° is positioned as shown in FIG. 11, with the bore 5 of the ball valve element 3 axially aligned with the axis X of the openings 10, 11 and the engagement slot 8 is substantially perpendicular thereto and aligned with the axis Y. The engagement slot 8 is directed towards the top opening of the cavity 4. The valve stem 7 is then inserted into the engagement slot 8, and the valve lid 2 is attached to seal the valve assembly 100.

This method of assembly is only possible as the ball valve element 3 has been provided with the flat upper and lower surfaces 9, 9A. These surfaces allow the ball valve element 3 to be rotated within the cavity 4 from the entry position to the use position. Such a rotation would not be possible with a conventional completely spherical ball valve.

The invention claimed is:

1. A method of assembling the top entry ball valve, comprising:
   providing:
      a housing with a central cavity communicating with two bores which define a flow path through the housing;

a ball valve element with a through bore and first and second flat surfaces on opposite sides of the element, the first flat surface including a first engagement slot extending from the first flat surface to the through bore and the second flat surface including a second engagement slot extending from the second flat surface to the through bore, the first and second engagement slots having substantially the same shape and dimensions;

first and second seats; and first and second protective rings for receiving and supporting at least a portion of the first and second seats, inserting at least a portion the first and second seats into the first and second protective rings respectively;

inserting the first and second seats and rings into the central cavity, aligned with the bores of the housing;

inserting the ball element into the through cavity, with the central bore transverse to the flow path and the first and second flat surfaces extending transverse to the flow path;

rotating the ball element until the through bore is substantially aligned with the flow path.

2. The method of claim 1, further comprising:

inserting a valve stem into one of the first and second engagement slots of the ball valve element; and attaching a valve lid over the cavity to seal the valve assembly.

3. A top entry ball valve comprising:

a housing with a central cavity communicating with two bores which define a flow path through the housing;

a ball valve element comprising a through bore, rotatably mounted within the central cavity for rotation about an axis for selectively aligning the through bore with the housing bores, the ball valve element further comprising first and second flat surfaces on opposite sides of the ball valve element, the surfaces being perpendicular to the axis, the first flat surface including a first engagement slot extending from the first flat surface to the through bore and the second flat surface including a second engagement slot extending from the second flat surface to the through bore, the first and second engagement slots having substantially the same shape and dimensions;

first and second seats, configured to provide a seal between the ball valve element and the central cavity; and first and second protective rings for receiving and supporting at least a portion of the first and second seats.

4. A top entry ball valve according to claim 3, wherein the first and second seats are made of a thermoplastic.

5. A top entry ball valve according to claim 3, wherein the first and second protective rings are made of a metal.

* * * * *

UNITED STATES PATENT AND TRADEMARK OFFICE
CERTIFICATE OF CORRECTION

PATENT NO. : 10,145,478 B2  
APPLICATION NO. : 15/605576  
DATED : December 4, 2018  
INVENTOR(S) : Hawa Page 1 of 1

It is certified that error appears in the above-identified patent and that said Letters Patent is hereby corrected as shown below:

In the Claims

At Column 5, Line 5, Claim 1 delete "bore and" and insert --bore, and--

At Column 5, Lines 18–19, Claim 1 delete "the through cavity, with the central bore" and insert --the central cavity, with the through bore--

Signed and Sealed this  
Ninth Day of April, 2019

Andrei Iancu  
*Director of the United States Patent and Trademark Office*